(12) United States Patent
Manabe

(10) Patent No.: US 6,246,835 B1
(45) Date of Patent: Jun. 12, 2001

(54) STRUCTURE OF LID OF BATTERY CHAMBER IN CAMERA

(75) Inventor: Mitsuo Manabe, Omiya (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/409,080

(22) Filed: Sep. 30, 1999

(30) Foreign Application Priority Data

Sep. 30, 1998 (JP) .................................................. 10-278014

(51) Int. Cl.[7] .................................................. G03B 15/03
(52) U.S. Cl. ............................................ 396/177; 396/539
(58) Field of Search .................................. 396/176, 177, 396/178, 539

(56) References Cited

U.S. PATENT DOCUMENTS 5,943,520 * 8/1999 Komatsuzaki et al. .......... 396/177 X

FOREIGN PATENT DOCUMENTS 7-295048    10/1995 (JP) .

* cited by examiner

*Primary Examiner*—W. B. Perkey
(74) *Attorney, Agent, or Firm*—Nixon Peabody LLP; David S. Safran

(57) ABSTRACT

A top face of a battery chamber lid is almost flush with an electronic flash housing to form a part of the top of a camera casing. More specifically, the electronic flash housing and the battery chamber lid are formed and arranged adjacently to form a part of the top of the camera casing. This eliminates the difference in level between the battery chamber lid and the electronic flash housing, and eliminates the necessity of providing a filler member for filling the difference in level. This makes it easier to manufacture the camera casing, and raises the strength of the camera casing.

2 Claims, 4 Drawing Sheets

STRUCTURE OF LID OF BATTERY CHAMBER IN CAMERA

BACKGROUND OF THE INVENTION

1. Field of the Invention

The present invention relates generally to the structure of a lid of a battery chamber in a camera, and more particularly to the structure of a lid for closing a battery chamber defined between an electronic flash part and a film chamber in a camera casing.

2. Description of Related Art

A camera disclosed in Japanese Patent Provisional Publication No. 7-295048 has a battery chamber defined at the rear of an electronic flash part arranged at the upper front corner of a camera casing. The longitudinal direction of the battery chamber is parallel to the film feeding direction. A battery is loaded into the battery chamber by opening a battery chamber lid, which is openably attached to the side of the camera casing. When the battery chamber lid is closed, the battery chamber lid appears to be a part of the camera casing. The camera also has an electronic flash part that is fixed in the camera casing.

In a well-known camera with a pop-up electronic flash part, the electronic flash part is arranged in an electronic flash housing, which is attached to the camera casing so that the electronic flash part can pivot from a recessed position to its operating position.

FIG. 4 shows a part of the top of a camera casing 1 of a conventional camera, which is provided with the pop-up electronic flash part. FIG. 5 is a partially sectional view of the camera casing 1. As shown in FIG. 4, a top face 2 of the camera casing 1 is cut off at widthwise side corners. An electronic flash housing 3 is arranged at the front side of the camera casing 1 and a battery chamber lid 4 is arranged at the rear side. In short, the electronic flash housing 3 is arranged opposite to the battery chamber lid 4 across a filler piece 5 formed in the top face 2.

The conventional camera has the following disadvantages. The filler piece 5 must be formed in the top face 2 of the camera casing 1, and this makes it difficult to manufacture the camera casing 1. Moreover, the strength of the filler piece 5 is unavoidably lowered, and this decreases the strength of the camera casing 1.

SUMMARY OF THE INVENTION

In view of the foregoing, it is an object of the present invention to provide a structure of a battery chamber lid for a camera, which makes it easier to manufacture the camera casing, and increases the strength of the camera casing.

To achieve the above-mentioned object, the present invention is directed to a camera, comprising: a casing of the camera; a pop-up electronic flash part having an electronic flash housing; a film chamber; a battery chamber defined between the pop-up electronic flash part and the film chamber; and a battery chamber lid which opens and closes the battery chamber; wherein the battery chamber lid and the electronic flash housing are adjacently arranged to form a part of a top face of the casing.

According to the present invention, the battery chamber effectively utilizes the space between the electronic flash part and the film chamber in order to reduce the size of the camera. Moreover, the battery chamber lid and the electronic flash housing are formed and arranged adjacently to form a part of the top face of the camera casing. This eliminates the difference in level between the battery chamber lid and the electronic flash housing. It is therefore unnecessary to form a filler member for filling the difference in level, and this makes it easier to manufacture the camera casing and raises the strength of the camera casing.

Preferably, the pop-up electronic flash part is supported on a pivot provided in the casing, the pop-up electronic flash part pivoting on the pivot; and an edge of the electronic flash housing adjacent to the battery chamber lid is formed in such a manner as to be positioned inside the battery chamber lid when the pop-up electronic flash part pivots. This makes inconspicuous the difference in level at the boundary between the electronic flash housing and the battery chamber lid. This improves the external appearance of the camera.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

A description will hereunder be given of the present invention in further detail by way of example with reference to the accompanying drawings.

Figure 1:
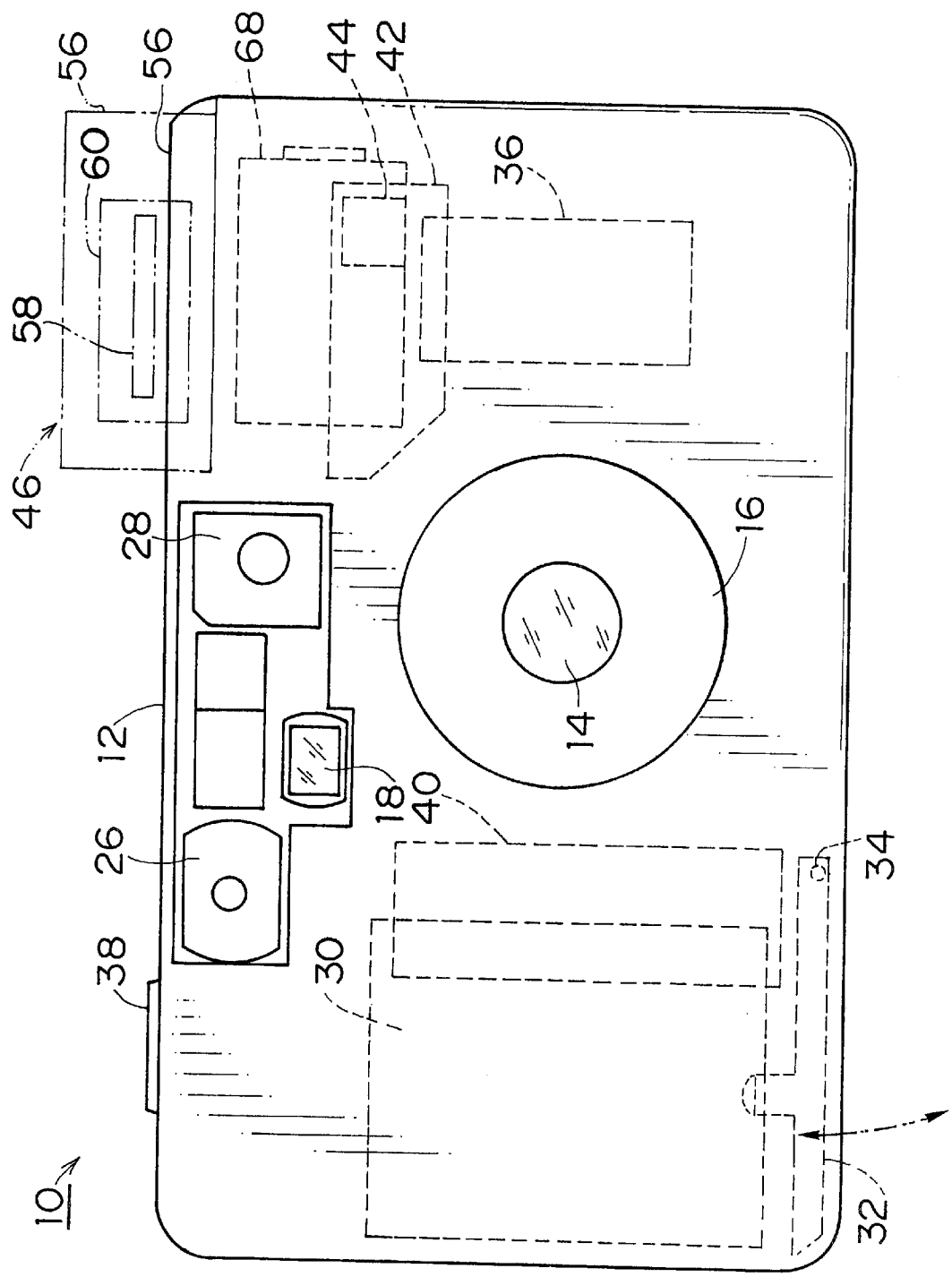
FIG. 1 a front view showing a camera, to which the structure of a battery chamber lid according to an embodiment of the present invention is applied.
Figure 2:
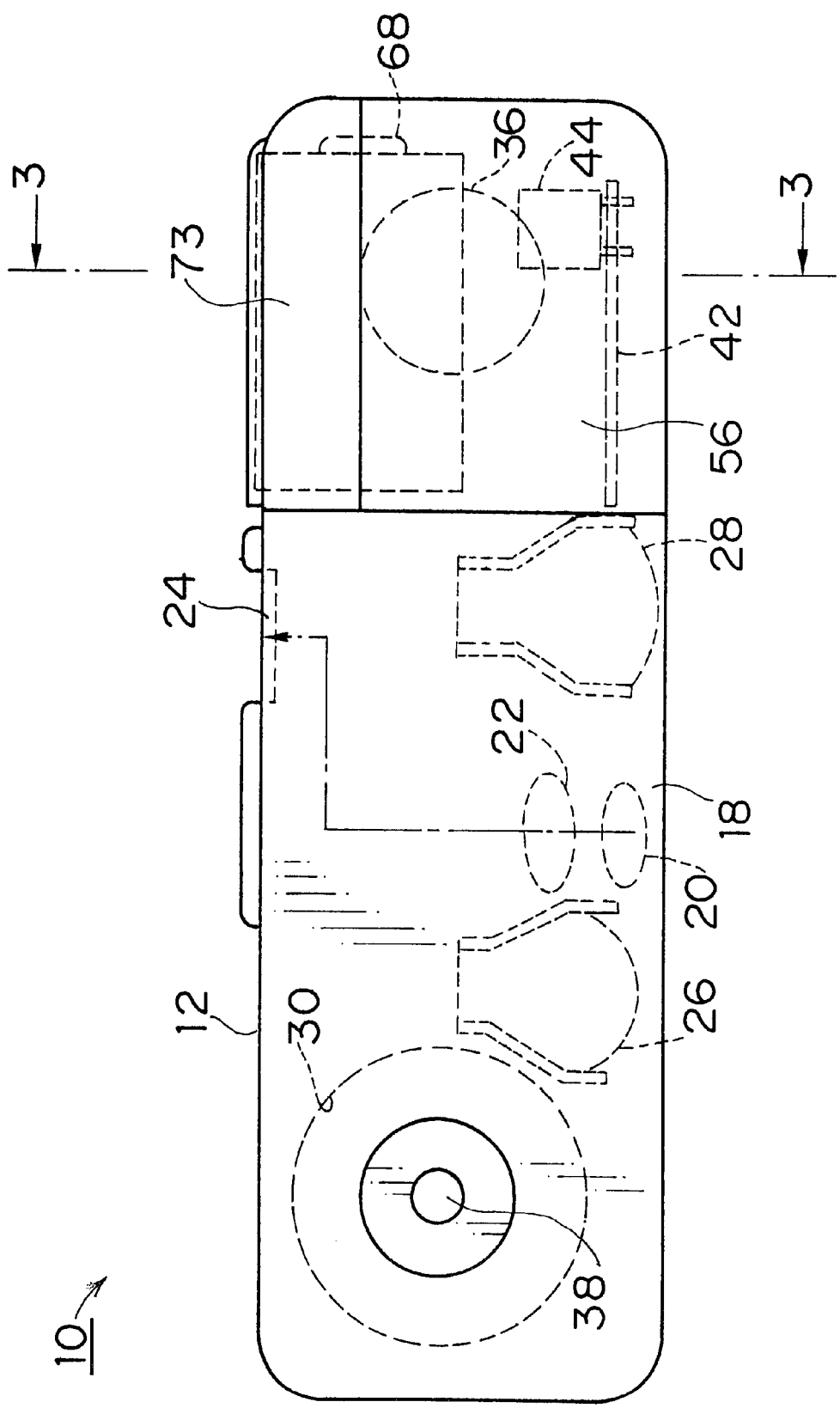
FIG. 2 is a top view showing the camera in FIG. 1.
Figure 3:
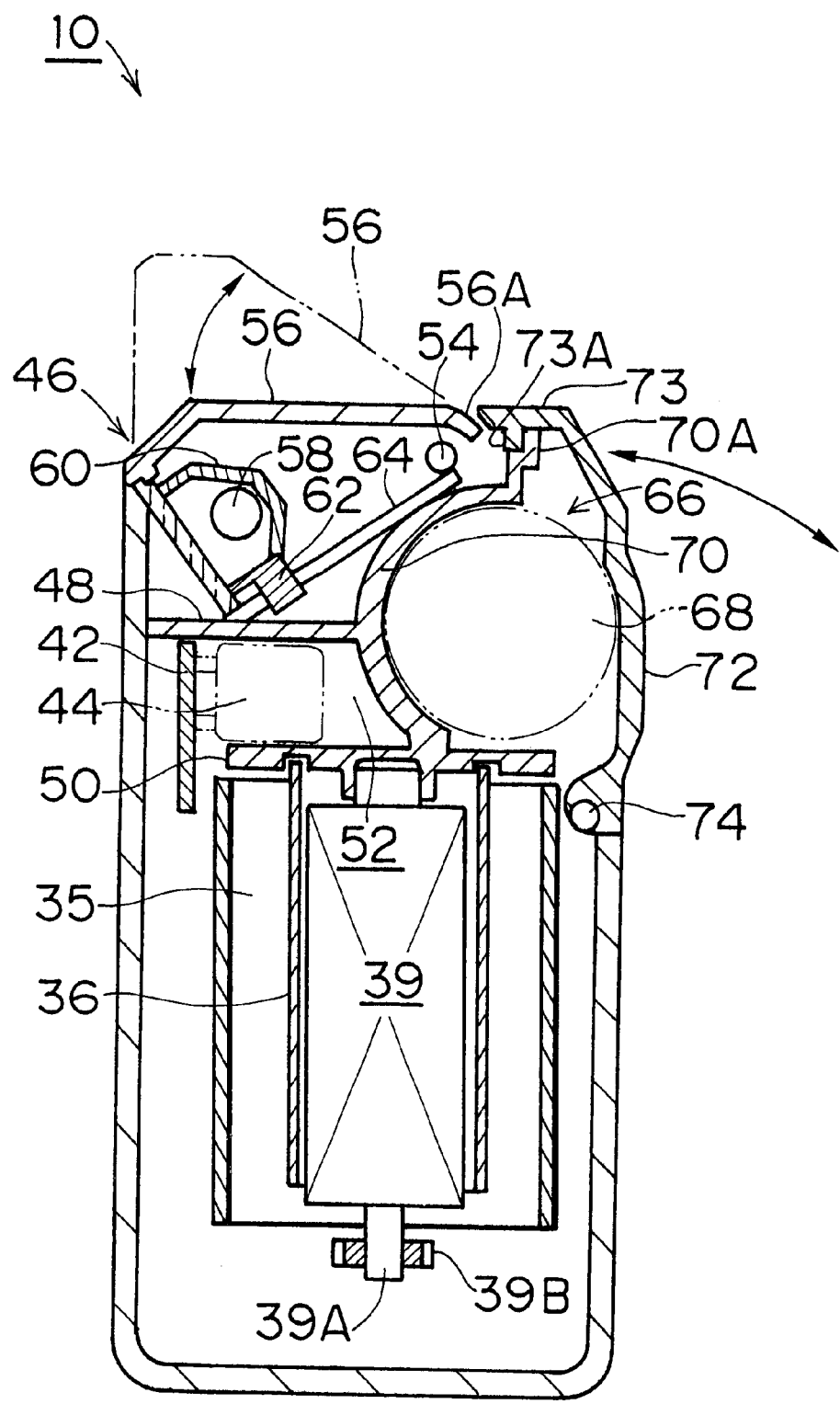
FIG. 3 is a sectional view showing the essential parts of the camera in FIG. 1.
Figure 4:
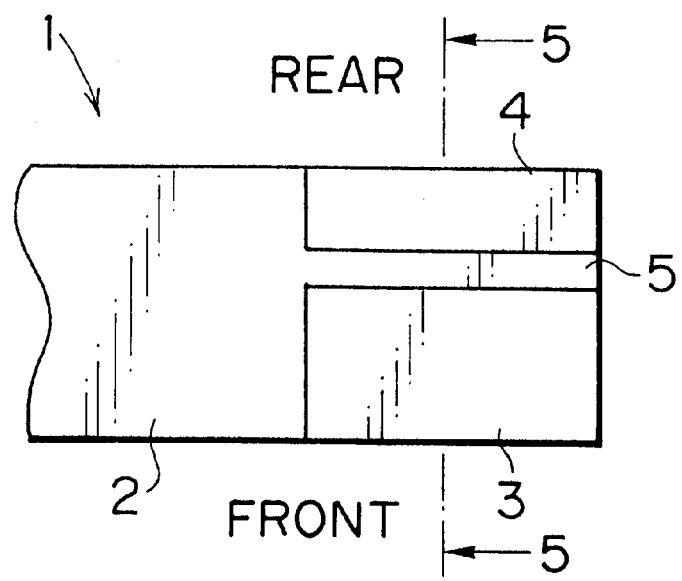
FIG. 4 is an explanation drawing showing a part of the top of a casing of a conventional camera.
Figure 5:
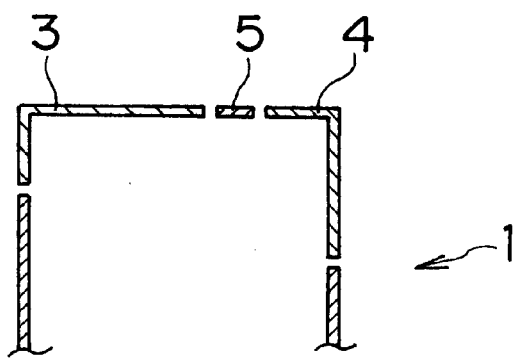
FIG. 5 is an explanation sectional view of the casing of the conventional camera in FIG. 4.

FIG. 1 is a front view of a camera 10 to which the structure of a battery chamber lid according to an embodiment of the present invention is applied. FIG. 2 is a top view of the camera 10, and FIG. 3 is a sectional view showing the essential parts of the camera 10 taken along a line 3—3 in FIG. 2.

As shown in FIGS. 1 and 2, a casing 12 of the camera 10 is substantially shaped as a box, which is long from side to side. A zoom lens barrel 16 including a taking lens 14 is arranged at the center of a front face of the camera casing 12 in FIG. 1. The zoom lens barrel 16 is a so-called collapsible zoom lens barrel, which moves from a collapsing position to an initial position when a power switch of the camera 10 is turned on. The zoom lens barrel 16 is zoomed in accordance with the operation of a zoom lever (not shown) provided on the camera 10 in order to set a desired magnification of the taking lens 14.

An objective part 18 of a finder is provided above the zoom lens barrel 16 in the camera casing 12. Movable lenses 20 and 22 are arranged in the objective part 18 as indicated by broken lines in FIG. 2. The movable lenses 20 and 22 move forward and backward along a finder optical axis in connection with the zooming operation of the zoom lens barrel 16. Consequently, an image of a subject magnified according to the magnification set by the zoom lens barrel 16 is observed through an eyepiece 24 of the finder.

As shown in FIG. 1, an autofocus (AF) light projecting part 28 is arranged at the right side of the objective part 18 of the finder, and an AF light receiving part 26 is arranged at the left side of the objective part 18. A film cartridge chamber 30 is defined at the left side of the zoom lens barrel 16 as indicated by a broken line in FIG. 1. A lid 32 for opening and closing the film cartridge chamber 30 is provided at the bottom of the film cartridge chamber 30 in such a way as to freely turn on a pivot 34. A film cartridge (not shown) is loaded into the film cartridge chamber 30 by opening the lid 32.

When the film cartridge is loaded in the film cartridge chamber 30, a film wound in the film cartridge is automatically fed from the film cartridge by a feed mechanism (not shown), which is built in the camera 10. Then, the leader of the film passes through an exposure area, and the film stops feeding when the leader of the film has been wound by a predetermined amount on a take-up spool 36 in a take-up chamber 35 shown in FIG. 3. Thereafter, the film is wound onto the take-up spool 36 on a frame-by-frame basis upon taking a photograph by pressing a shutter release button 38 in FIG. 1. A drive motor 39 for the feed mechanism is provided inside the take-up spool 36 as shown in FIG. 3. The feed mechanism is driven by the drive motor 39 through a gear mechanism including a gear 39B connected to an output shaft 39A of the drive motor 39.

A main capacitor 40, which supplies electricity to an electronic flash part 46, is arranged vertically in a space between the film cartridge chamber 30 and the camera casing 12 as indicated by a broken line in FIG. 1. An electronic flash booster circuit board 42 is arranged above the take-up chamber 35. A trigger coil 44 is attached on the electronic flash booster circuit board 42 so that the trigger coil 44 is arranged in a space 52 defined between a spool bushing 50 and a partition 48 for a chamber in which the electronic flash part 46 is recessed when unused.

The electronic flash part 46 is supported on a pivot 54 in the camera casing 12. The unused electronic flash part 46 is recessed in the camera casing 12 as represented with solid lines in FIG. 3. When the electronic flash part 46 is used, the electronic flash part 46 pivots to its operating position represented with alternate long and two short dashes line in FIG. 3. In short, the electronic flash part 46 in this embodiment is a pop-up electronic flash of the pivoting type, but the present invention is not restricted to this. Alternatively, the electronic flash part 46 may be a pop-up electronic flash of another type that rectilinearly rises from the recessed position to the operating position.

The electronic flash part 46 comprises an electronic flash housing 56, inside which an emission tube 58 and a reflector 60 are arranged. The reflector 60 reflects light emitted from the emission tube 58 forward. The reflector 60 is supported on a guide bar 64, which is disposed in the electronic flash housing 56, through a guide member 62 so that the reflector 60 can move forward and backward. The reflector 60 is moved forward and backward in connection with the zooming operation of the zoom lens barrel 16 in FIG. 1. In other words, the electronic flash part 46 is a zoom electronic flash with a variable illumination angle, which works in connection with the zooming operation.

A battery chamber 66, in which a battery 68 is loaded, is defined at the rear of the electronic flash part 46. A semi-arc partition 70 is provided between the battery chamber 66 and the chamber in which the electronic flash part 46 is recessed. The battery chamber 66 effectively utilizes a space between the electronic flash part 46 and the take-up chamber 35. This reduces the size of the camera 10.

In this embodiment, one element serves as the partition 70 for the battery chamber 66, the partition 48 for the electronic flash part 46, and the spool bush 50. This reduces the number of parts for the camera 10 and makes it easier to assemble the camera 10.

A lid 72 of the battery chamber 66 has almost L-shaped section, and the bottom of the battery chamber lid 72 is attached to the back of the camera casing 12 so that the battery chamber lid 72 can turn on a pivot 74. The battery chamber lid 72 has a horizontally-bending top face 73 at the upper part thereof. A hook 73A is formed at the bottom of the top face 73. The hook 73A is elastically engaged to a hook 70A formed at the top of the partition 70, so that the battery chamber lid 72 is held at the closed position. The battery chamber lid 72 is opened by releasing the hook 70A from the hook 73A by a releasing member (not shown).

In this embodiment, the top face 73 of the battery chamber lid 72 is almost flush with the electronic flash housing 56 at the recessed position, and the top face 73 and the electronic flash housing 56 form a part of the top of the camera casing 10. More specifically, the battery chamber lid 72 is formed so that the battery chamber lid 72 can form the part of the top of the camera casing 10 with the electronic flash housing 56. This eliminates the difference in level between the top face 73 of the battery chamber lid 72 and the electronic flash housing 56. It is therefore unnecessary to form a filler member as a part of the camera casing 12 for filling the difference in level, and this makes it easier to manufacture the camera casing 12 and makes the camera casing 12 tough.

In this embodiment, an edge 56A of the electronic flash housing 56 adjacent to the top face 73 of the battery chamber lid 72 is curved in order to be positioned inside the battery chamber lid 72 when the electronic flash part 46 pivots. This makes inconspicuous the difference in level at the boundary between the electronic flash housing 56 and the battery chamber lid 72 when the electronic flash part 46 pivots. This improves the external appearance of the camera 10.

In this embodiment, the battery chamber lid 72 is rotatably attached to the back of the camera casing 12, but the present invention is not restricted to this. Alternatively, the battery chamber lid 72 may be rotatably attached to the side of the camera casing 12 through a pivot. The ratio of the areas of the electronic flash housing 56 and the battery chamber lid 72 at the top of the camera casing 12 is not restricted to the ratio shown in FIG. 3, but it may be determined arbitrarily according to the sizes of the electronic flash housing 56, the battery chamber lid 72 and the camera casing 12.

As set forth hereinabove, the structure of the battery chamber lid according to the present invention reduces the size of the camera by effectively utilizing the space between the electronic flash part and the film chamber to define the battery chamber. The battery chamber lid and the electronic flash housing are arranged as to form a part of the top face of the camera casing. This makes it easier to manufacture the camera casing, and raises the strength of the camera casing.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera comprising:

a casing of the camera;

a pop-up flash part having an electronic flash housing;

a film chamber;

a battery chamber defined between the pop-up electronic flash part and the film chamber with a portion of the battery chamber underlying the electronic flash housing in a vertical direction; and a battery chamber lid which opens and closes the battery chamber;

wherein the battery chamber lid and the electronic flash housing are arranged directly adjacent to each other so as to form together a substantially continuous part of a top face of the casing when both the pop-up flash and the battery chamber lid are in a closed position.

2. The camera as defined in claim 1, wherein:

the pop-up electronic flash part is supported on a pivot provided in the casing, the pop-up electronic flash part pivoting on the pivot; and an edge of the electronic flash housing adjacent to the battery chamber lid is formed in such a manner as to be positioned inside the battery chamber lid when the pop-up electronic flash part pivots.

* * * * *